US012128438B2

(12) United States Patent
Wang

(10) Patent No.: US 12,128,438 B2
(45) Date of Patent: Oct. 29, 2024

(54) SPRAY GUN FOR CONVENIENT LIQUID FILLING

(71) Applicant: Yun Wang, Zhejiang (CN)

(72) Inventor: Yun Wang, Zhejiang (CN)

( * ) Notice: Subject to any disclaimer, the term of this patent is extended or adjusted under 35 U.S.C. 154(b) by 0 days.

(21) Appl. No.: 18/462,211

(22) Filed: Sep. 6, 2023

(65) Prior Publication Data

US 2024/0157385 A1 May 16, 2024

(30) Foreign Application Priority Data

Nov. 15, 2022 (CN) ......................... 202223040480.3

(51) Int. Cl.
*B05B 7/24* (2006.01)
*B05B 7/08* (2006.01)

(52) U.S. Cl.
CPC .......... *B05B 7/2408* (2013.01); *B05B 7/0823* (2013.01)

(58) Field of Classification Search
CPC ............................ B05B 7/2408; B05B 7/0823
USPC .......................................................... 239/302
See application file for complete search history.

(56) References Cited

U.S. PATENT DOCUMENTS

| | | | | |
|---|---|---|---|---|
| 6,247,995 | B1 * | 6/2001 | Bryan | B05B 7/2472 435/189 |
| 6,263,980 | B1 * | 7/2001 | Wadge | B25F 3/00 173/171 |
| 6,286,611 | B1 * | 9/2001 | Bone | B25F 3/00 173/217 |
| 6,383,062 | B1 * | 5/2002 | Jou | B24C 5/02 239/375 |
| 6,390,386 | B2 * | 5/2002 | Krohn | B05B 15/16 239/71 |
| 6,431,466 | B1 * | 8/2002 | Kitajima | B05B 12/002 239/433 |
| 6,527,200 | B1 * | 3/2003 | Huang | B05B 7/0815 239/296 |
| 9,180,472 | B2 * | 11/2015 | Munn | B05B 15/55 |
| 2019/0232307 | A1 * | 8/2019 | Becker | B05B 7/0815 |

* cited by examiner

*Primary Examiner* — Chee-Chong Lee
(74) *Attorney, Agent, or Firm* — Hawaii Patent Services; Nathaniel K. Fedde; Kenton N. Fedde

(57) ABSTRACT

The present invention provides a spray gun for conveniently adding liquid, including a gun body, a material pot, a thimble assembly and a trigger assembly, the gun body is provided with a liquid filling channel, the lower end of the liquid filling channel communicates with the material pot, and the liquid filling channel penetrates upwardly through the gun body, so that the upper end of the liquid filling channel is connected to the outside world, and the upper end of the gun body is provided with a sealing cover assembly for sealing off the liquid filling channel. The solution, the sealing cover assembly is located on the top of the gun body, and the space for operation is large when liquid is added, so as to realize the purpose of conveniently and quickly adding liquid.

18 Claims, 11 Drawing Sheets

SPRAY GUN FOR CONVENIENT LIQUID FILLING

RELATED APPLICATION

This application claims priority to Chinese Patent application No. 202223040480.3 filed on Nov. 15, 2022, the entire contents of which is herein incorporated by reference.

TECHNICAL FIELD

The present invention relates to the technical field of spraying tools, and specifically relates to a spray gun for convenient liquid filling.

BACKGROUND

The spray gun is a tool used for spraying liquids such as paint, coating and beauty lotion. It is mainly composed of a gun body, a material pot, a thimble, and a trigger. When the spray gun is in use, it is necessary to pour paint and other liquids for spraying into the pot. Due to the limited capacity of the pot, in the process of spraying the object, the pot needs to be unscrewed to add liquid every time the liquid is sprayed. The suction pipe is exposed during the liquid addition process, and the liquid dripping on the suction pipe not only pollutes the environment but also wastes materials.

In order to solve the above problem, there is also a solution to provide an additional liquid filling port on the pot lid of the material pot.

U.S. Patent Document No. 20180200742 discloses a spray gun comprising a gun body and a liquid container disposed below the gun body, a hollow connecting tube is disposed between the gun body and the liquid container. The liquid container is connected to the inside of the gun body through the hollow connecting tube; and the liquid container has an inlet hole at the top of the liquid container; and the head of the gun body is located above the top of the liquid container, and tilted downward away from the top of the liquid container. In the present invention, there is a large space above the liquid inlet hole, which provides an effective space for smooth liquid feeding operation, and the liquid can be added to the liquid container without changing the liquid container.

But, the above program, because the liquid filling port is always still located below the gun head, its operable space is still limited, and the liquid filling is still not convenient enough.

Of course, there is also from the top to the liquid container to add liquid program, U.S. Patent No. 20190232307 patent document disclosed a sprayer, the hopper is set in the top of the spray gun, the sprayer's hopper and the spray gun is removable, the structure and application scenarios are relatively unique. In addition, because the hopper is set on the top of the spray gun, the hopper is heavy and has a high center of gravity after the liquid is added, when used, the user's hand can only hold the handle of the spray gun due to the need to operate the switch on the spray gun, so the stability of the spray gun is very poor when used, and the phenomenon of tipping over is very easy to occur.

SUMMARY

The present invention provides a spray gun for convenient liquid filling, comprising a gun body, a material pot, a thimble assembly and a trigger assembly, the gun body having a connection seat integrally provided at the lower end thereof, the material pot being connected and fixed to the connection seat, the gun body being provided with a liquid filling channel, the lower end of the liquid filling channel being connected to the material pot, the liquid filling channel running upwardly through the gun body so as to make the upper end of the liquid filling channel connected to the outside world, and the gun body being provided with a sealing cover assembly at the upper end thereof for closing the liquid filling channel.

This solution, by setting up the liquid filling channel, the liquid can be added to the material pot from the top or side of the gun without unscrewing the material pot from the gun, so that the liquid on the suction tube will not drip to the ground to pollute the environment and cause waste, and the suction tube will not stick to the sundries; and at the same time, the cover body assembly is located on the top or side of the gun, and the space for the operation of the liquid when it is added is not affected at all by the other parts of the spray gun, so as to realize the purpose of convenient and fast liquid filling.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

In the drawings.

Figure 1:
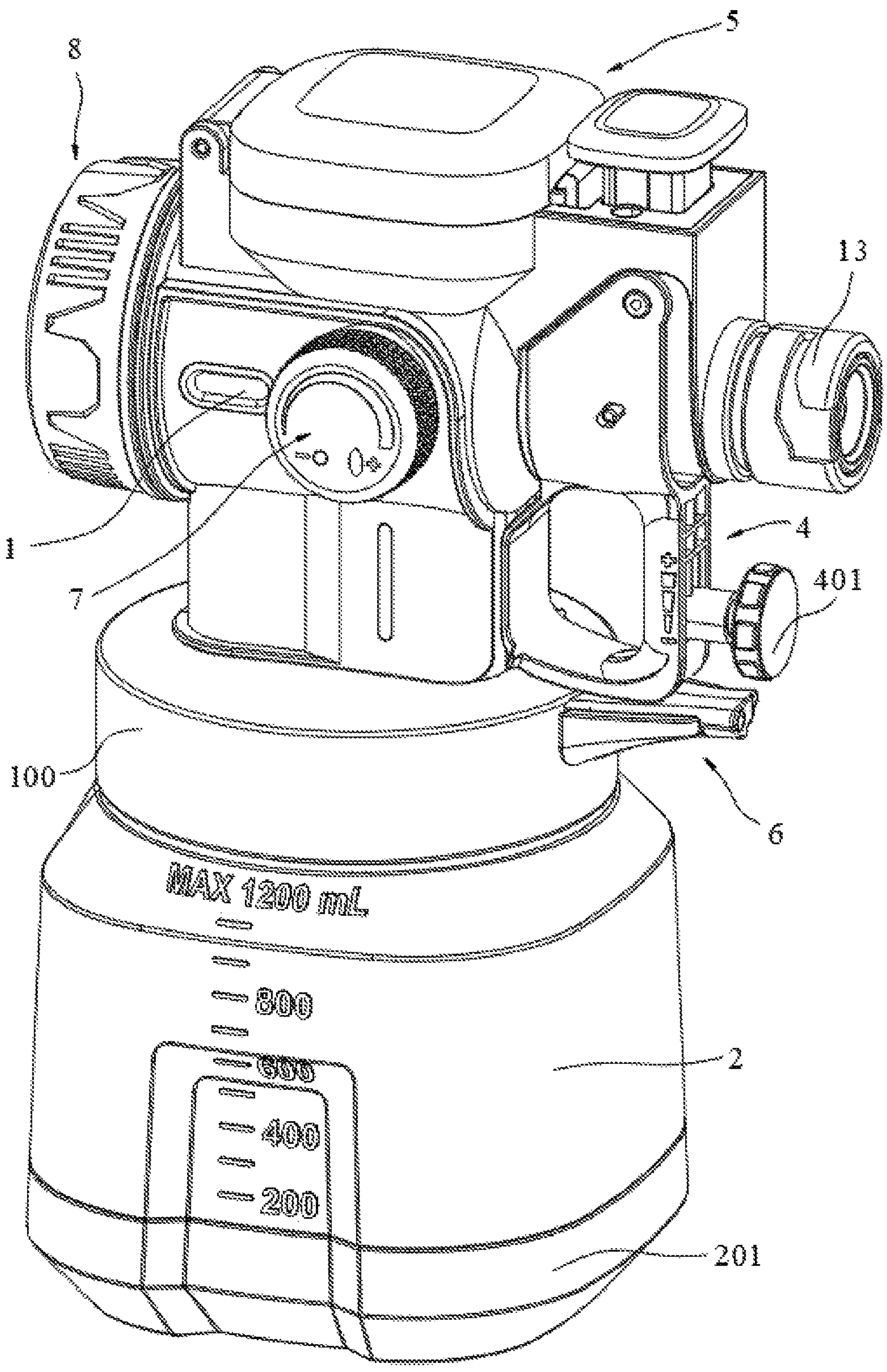
FIG. 1 is a schematic view of the structure of an embodiment of the present invention.

1, gun body; 100, connection seat; 101, liquid filling channel; 102, guide hopper; 1022, second locating tab; 1023, third locating tab; 103, feeding port; 104, first sealing ring; 105, second sealing ring; 106, connecting sleeve; 107, liquid outlet channel; 108, multi-tooth drive portion; 109, suction channel; 1011, first air outlet channel; 1010, material pot air inlet channel; 1031, first air hole; 1032, second air hole; 1012, second air outlet channel; 12, valve body mounting portion; 121, solid side; 120, notched side; 13, quick coupling;

2, material pot; 21, suction tube; 200, liquid accumulation portion; 201, pot seat;

3, thimble assembly; 31, thimble; 32, connecting sleeve; 33, connecting rod; 35, end cap; 310, first locating tab;

311, bowl-type sealing ring; 312, O-type sealing ring; 315, thimble head; 316, thimble seat; 34, thimble pull rod;

4, trigger assembly; 40, trigger body; 401, trigger knob;

5, sealing cover assembly; 51, cover body assembly; 52, locking assembly; 510, filling cap; 512, cover sealing ring; 511, liner; 521, locking clasp; 5210, lock tongue; 522, unlocking lever; 523, button cover; 503, inner cover; 5030, air nozzle; 504, duckbill valve;

6, trigger position holding device; 60, multi-toothed turntable; 61, left push block; 62, right push block; 63, push rod; 64, limiting block; 640, notch;

7, air valve assembly; 70, valve spool; 700, valve port; 72, spool sealing ring; 71, adjusting knob; 73, non-slip end cap;

8, nozzle assembly; 80, nozzle seat; 81, nozzle; 82, wind guide sleeve; 83, flow cap; 84, fastening knob.

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being “on,” “coupled to,” or “connected to” another element or layer, it can be directly on, directly coupled to or directly connected to the other element or layer, or intervening elements or layers may be present. In contrast, when an element is referred to as being “directly on,” “directly coupled to,” or “directly connected to” another element or layer, there are no intervening elements or layers present. Like numbers refer to like elements throughout. As used herein, the term “and/or” includes any and all combinations of one or more of the associated listed items.

As used in the description of the inventive concept and the appended claims, the singular forms “a,” “an,” and “the” are intended to include the plural forms as well, unless the context clearly indicates other.

As shown in FIGS. 1 to 10, a spray gun for convenient liquid filling, comprising a gun body 1, a material pot 2, a thimble assembly 3, and a trigger assembly 4, the gun body 1 having a connection seat 100 integrally provided at the lower end thereof, and the material pot 2 being connected and fixed to the connection seat 100, and in the present embodiment, the material pot 2 being fixed to the connection seat 100 by a threaded connection.

Of course, the connection between the material pot 2 and the connection seat 100 is not limited to a threaded connection, but can also be a snap connection or other connection as long as it is possible to tightly connect the material pot 2 to the connection seat 100, and to keep the liquid inside the material pot 2 from leaking.

A liquid filling channel 101 is provided in the gun body 1, the lower end of the liquid filling channel 101 is connected to the material pot 2, the liquid filling channel 101 runs upwardly through the gun body 1, so that the upper end of the liquid filling channel 101 is connected to the outside world; and a sealing cover assembly 5 is provided at the upper end of the gun body 1 for closing off the liquid filling channel 101; and the sealing cover assembly 5 is secured with the liquid filling channel 101 by means of threads or snaps.

The liquid filling channel 101 may be upwardly directed through the upper end of the gun body 1; or it may be upwardly directed through the side of the gun body 1.

Figure 4:
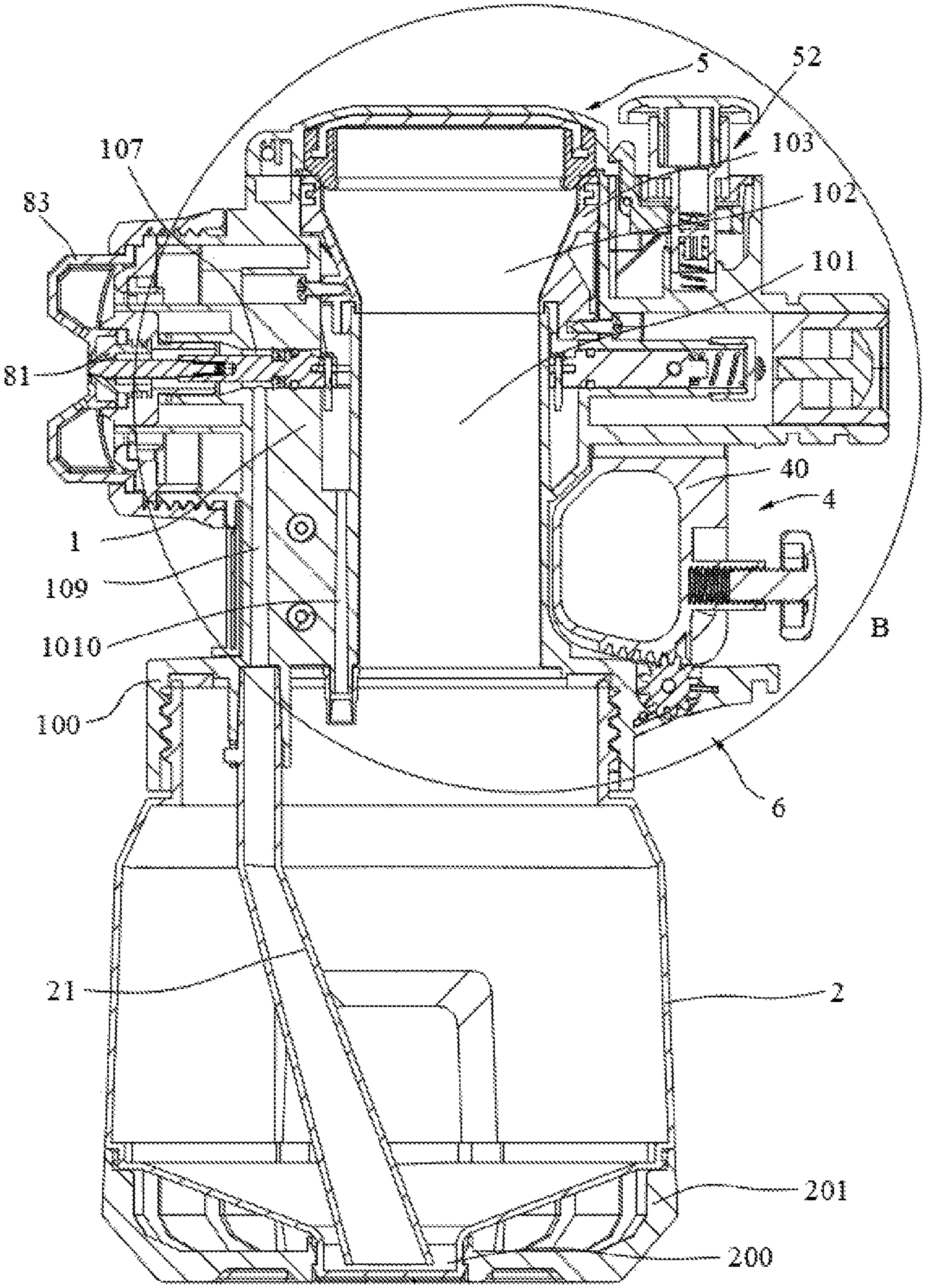
FIG. 4 is the A-A section view of FIG. 3.

In this embodiment, as shown in FIG. 4, in order to make it easier to refill the liquid, there is a guide hopper 102 sealed and fixed at the upper end of the liquid filling channel 101, and the guide hopper 102 has a large top and small bottom cross-section in the shape of a funnel; and the gun body 1 is provided with a feeding port 103 at the upper end of the gun body 1, and the feeding port 103 is shaped to match the upper end of the guide hopper 102, and the sealing cover assembly 5 is connected to the feeding port 103 to close the guide hopper 102.

Figure 5:
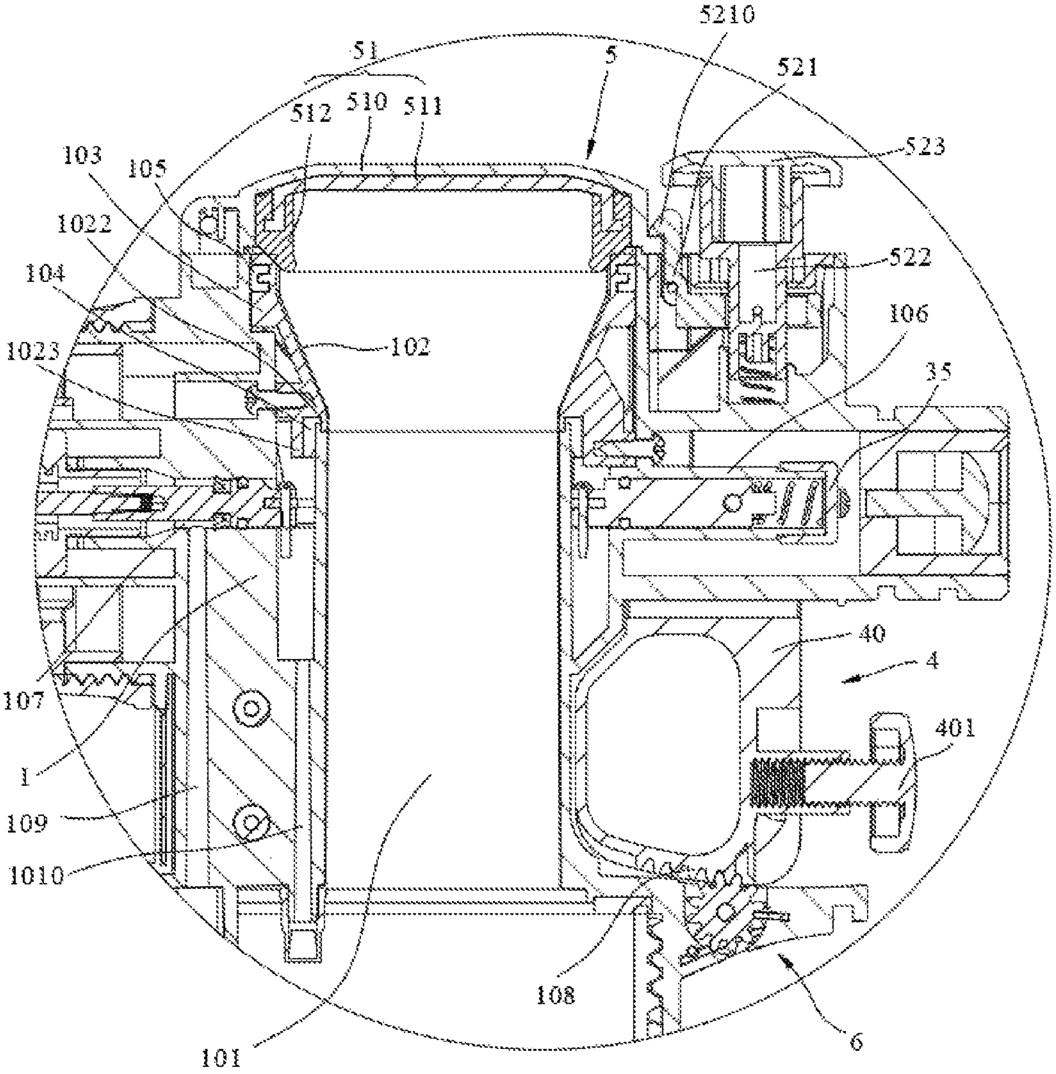
FIG. 5 is an enlarged view at B in FIG. 4.

Specifically, as shown in FIG. 5, a second locating tab 1022 and a third locating tab 1023 are integrally provided within the lower end of the guide hopper 102, and a first groove is formed between the second locating tab 1022 and the third locating tab 1023 to accommodate a sealing ring, and a first sealing ring 104 is provided within the first groove; and the upper end of the liquid filling channel 101 is tightly inserted into lower end of the guide hopper 102 against the second locating tab 1022, and the upper end of the liquid filling channel 101 is sealed with the lower end of the guide hopper 102; and a sealing ring groove is provided on the outer side of the upper end of the hopper 102, and a second sealing ring 105 is provided in the sealing ring groove to provide a seal between the guide hopper 102 and the feeding port 103.

The lower end of the guide hopper 102 is not limited to being connected to the upper end of the liquid filling channel 101, and the lower end of the guide hopper 102 may be integrally molded to extend through the liquid filling channel 101 into communication with the material pot 2.

As shown in FIG. 5, the sealing cover assembly 5 comprises a cover body assembly 51 and a locking assembly 52, the cover body assembly 51 comprising a filling cap 510 hinged at one end to the gun body 1, with a cover sealing ring 512 sealing the liquid filling channel 101 on the inside of the filling cap 510; and, in this embodiment, the cover sealing ring 512 is used to seal the guide hopper 102.

In this embodiment, in order to facilitate installation and reliable fixation of the cover sealing ring 512, there is also a liner 511 on the filling cap 510, the cover sealing ring 512, wrapped around the liner 511, the liner 511 is provided with a flange extending outwardly, and the flange is used to prevent the cover sealing ring 512 from falling off, and in order to reliably connect the liner 511 with the filling cap

510, a clasp or a screw, etc., may be provided between the liner 511 and the filling cap 510.

As shown in FIG. 5, in this embodiment, the locking assembly 52 comprises a locking clasp 521 having an L-shaped cross section which is attached to the gun body 1, and at the upper end of the locking clasp 521 is provided with a lock tongue 5210 which is away from the body of the locking clasp 521, and the lock tongue 5210 snaps onto the filling cap 510 when the cover body assembly 51 covers the liquid filling channel 101; and an unlocking lever 522 is attached to the bottom of the locking clasp 521, and pressing down on the unlocking lever 522 can rotate the locking clasp 521 by an angle, and the lock tongue 5210 disengages from the filling cap 510, so that the cover body assembly 51 can be opened.

A button cover 523 is provided on the top of the unlocking lever 522 for aesthetics and ease of pressing the unlocking lever 522.

The bottom of the unlocking lever 522 is provided with an unlocking lever resetting element. In this embodiment, the unlocking lever resetting element is preferably a spring, but of course it can also be a part with elasticity such as rubber, which can play the role of allowing the unlocking lever 522 to be reset.

The locking assembly 52 is not limited to the above structure, but can also be directly hand-triggered locking clasp 521, thereby realizing the locking and loosening of the lock tongue 5210 on the filling cap 510, as long as it can be realized that the cover body assembly 51 is convenient to realize the closure and opening of the guide hopper 102.

Figure 8:
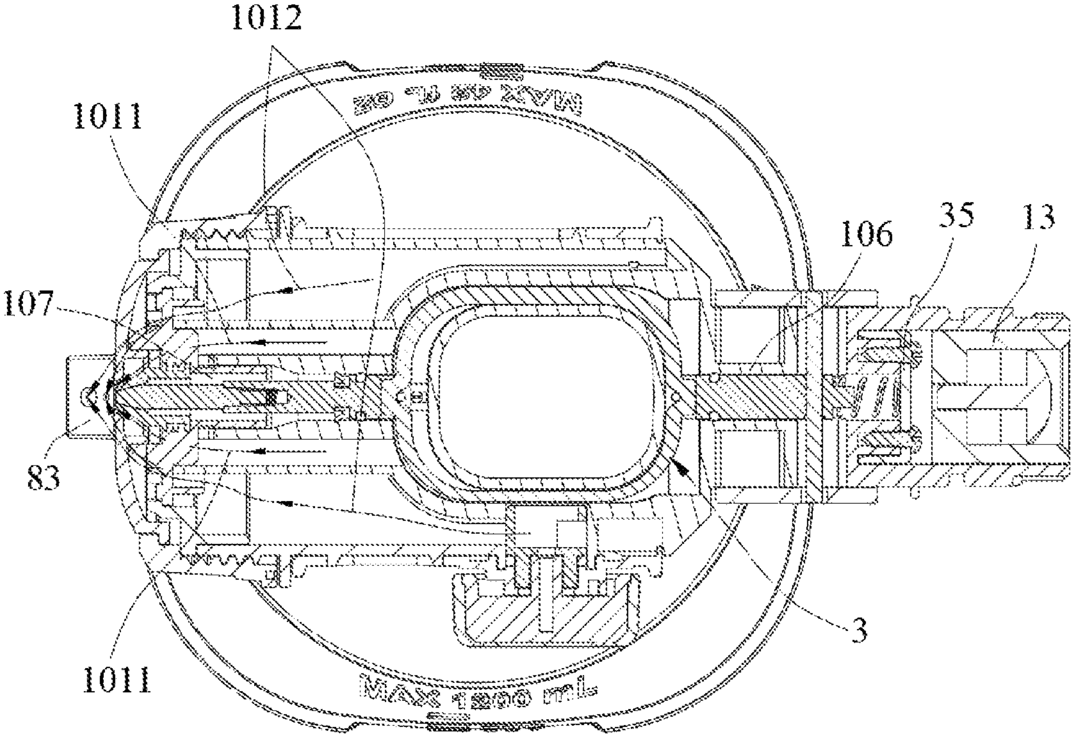
FIG. 8 is a C-C section view of FIG.
Figure 9:
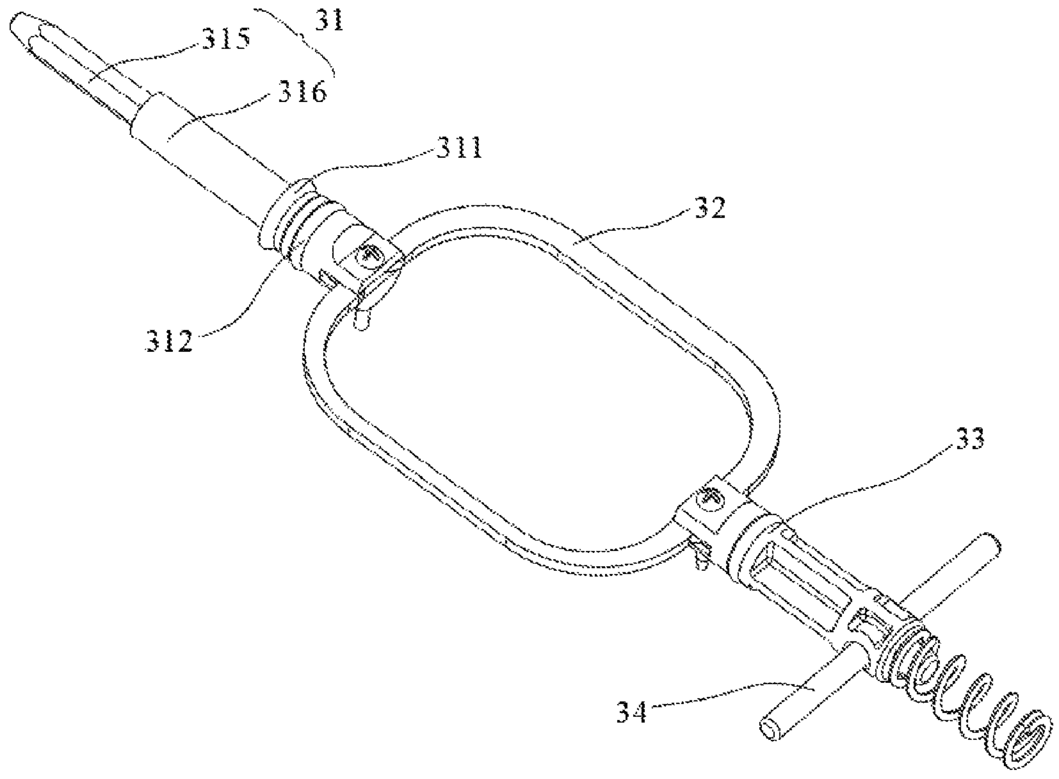
FIG. 9 is a schematic view of the structure of a thimble assembly in an embodiment of the present invention.
Figure 10:
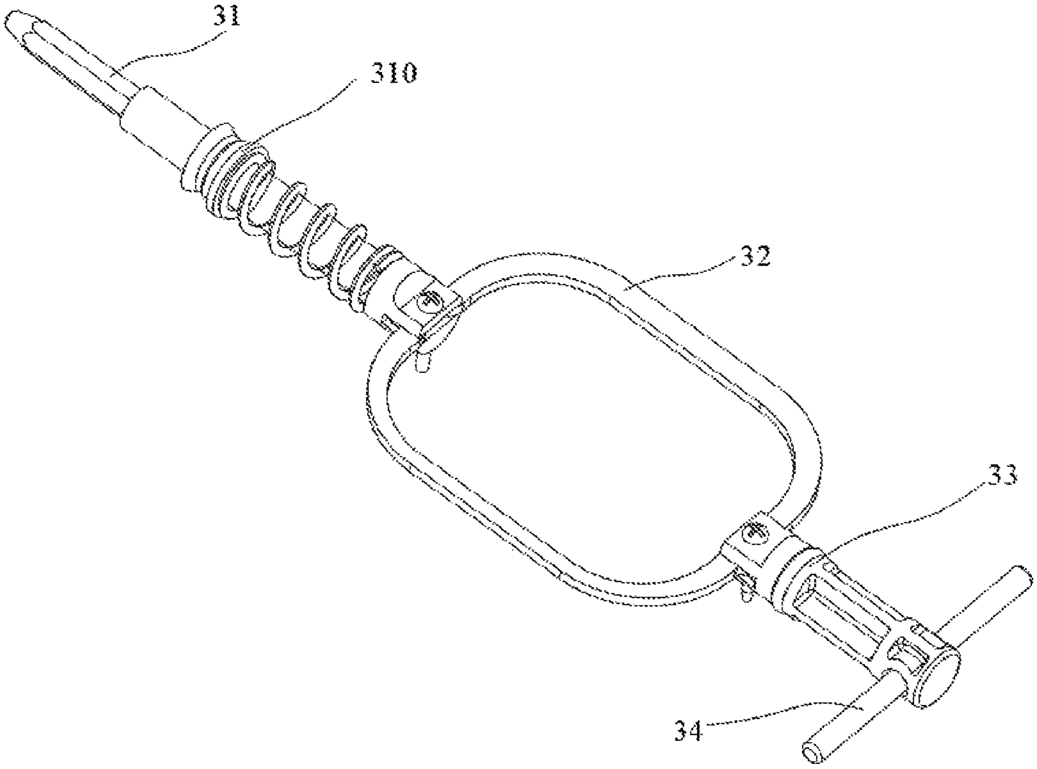
FIG. 10 is a schematic structural view of an alternative embodiment of the thimble assembly in an embodiment of the present invention.

As shown in FIGS. 8 and 9, the thimble assembly 3 comprises a thimble 31, a connecting sleeve 32, a connecting rod 33, and a thimble reset element; and the connecting sleeve 32 is connected at a rear end to a front end of the connecting rod 33, and the connecting sleeve 32 is connected at a front end to a rear end of the thimble 31; and the connecting sleeve 32 is socketed outside of the liquid filling channel 101, and the connecting sleeve 32 has a cross-sectional area in the axial direction of the connecting rod 33 greater than the cross-sectional area of the liquid filling channel 101; and the connecting sleeve 32 is movable back and forth in the peripheral portion of the liquid filling channel 101 a certain distance along the axial direction of the connecting rod 33.

Both the connecting rod 33 and the thimble 31 are connected to the connecting sleeve 32 by screws or pins.

Figure 7:
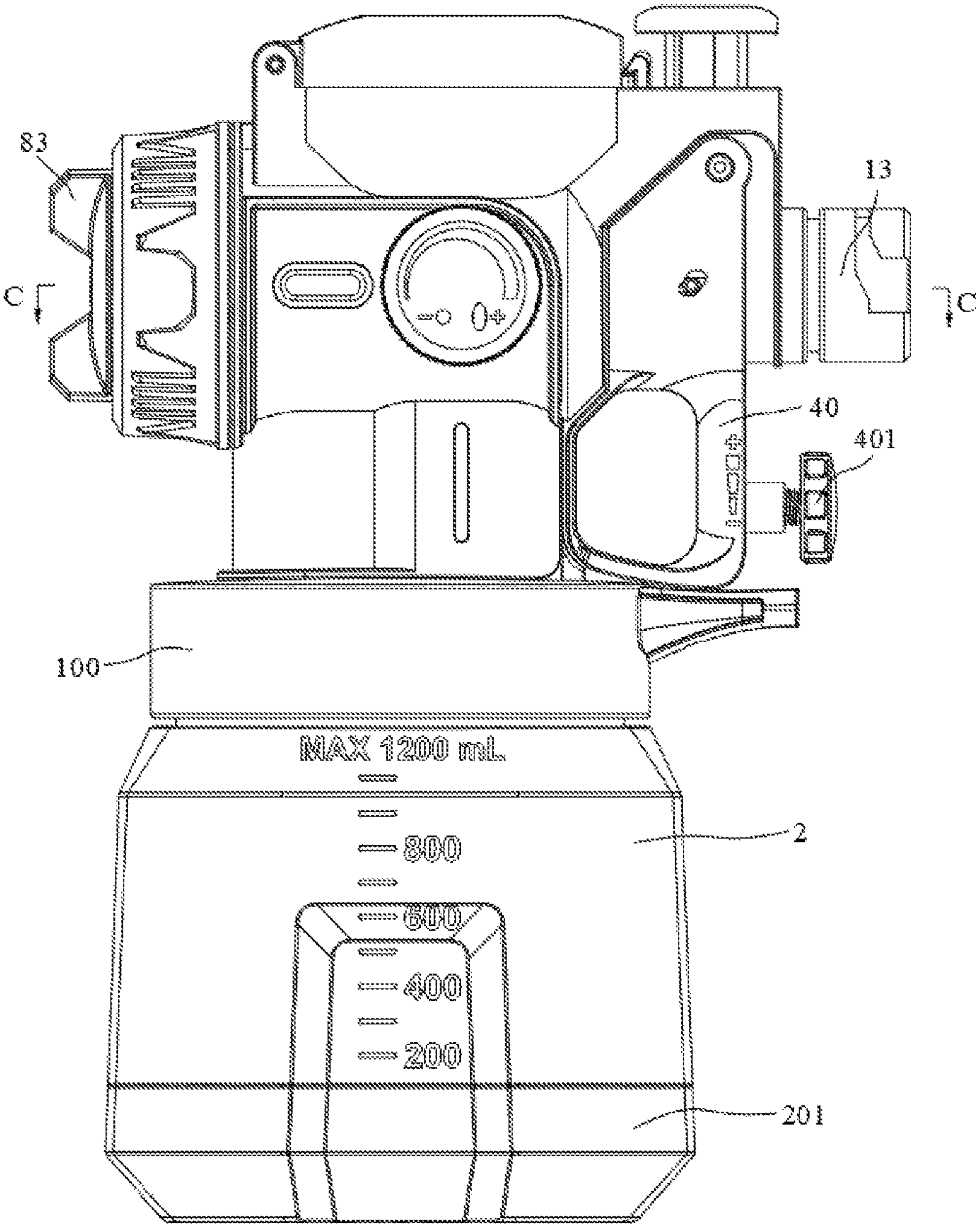
FIG. 7 is a main view of an embodiment of the present invention.

As shown in FIGS. 5 and 7, a connecting sleeve 106 is integrally provided in the gun body 1, the connecting rod 33 being disposed within the connecting sleeve 106, and sealing and slidingly mating with the connecting sleeve 106, an end cap 35 is provided on the gun body 1 closing off the end of the connecting sleeve 106, and the end cap 35 is secured to the gun body 1 by means of screws to facilitate the mounting and dismounting of the connecting rod 33 and the ejector pin reset element.

In this embodiment, the thimble reset element is preferably a spring, the spring resting against the rear end of the end cap 35 and the connecting rod 33. In this embodiment, the connecting sleeve 32 needs to be made of a rigid material in order to drive the ejector pin in a reciprocating motion.

In this embodiment, although the thimble resetting element is preferably a spring, it can also be a part with elasticity such as rubber, which can serve to reset the connecting rod 33 is sufficient.

This embodiment also discloses an additional embodiment of the thimble assembly 3 as follows, the thimble reset element is a spring, the thimble 31 is integrally provided with a first locating tab 310, the spring is sleeved on the thimble 31, and the spring rests against the first locating tab 310 between the first locating tab 310 and the liquid outlet channel 107 on the gun body 1. In this embodiment, the connecting sleeve 32 can be made of a rigid material or a flexible material, as the reset of the thimble 31 does not require the connecting sleeve 32 to be driven.

As shown in FIGS. 4, 5 and 7, a liquid outlet channel 107 is provided in the gun body 1, and the thimble 31 is located in the liquid outlet channel 107. The thimble 31 slides in the liquid outlet channel 107, and in order to prevent the liquid in the liquid outlet channel 107 from entering into the air outlet channel of the gun body 1, a sealing ring is provided on the thimble 31 to realize the sealing, and as shown in FIG. 9, in the present embodiment, an O-type sealing ring 312 and a bowl-type sealing ring 311 are provided on the thimble 31.

In the embodiment described above, the thimble 31 may also be split, as shown in FIG. 8, wherein the thimble 31 is divided into a thimble head 315 and a thimble seat 316, wherein the thimble head 315 and the thimble seat 316 may be connected to each other by means of threads, or by means of an interference fit or the like.

Figure 2:
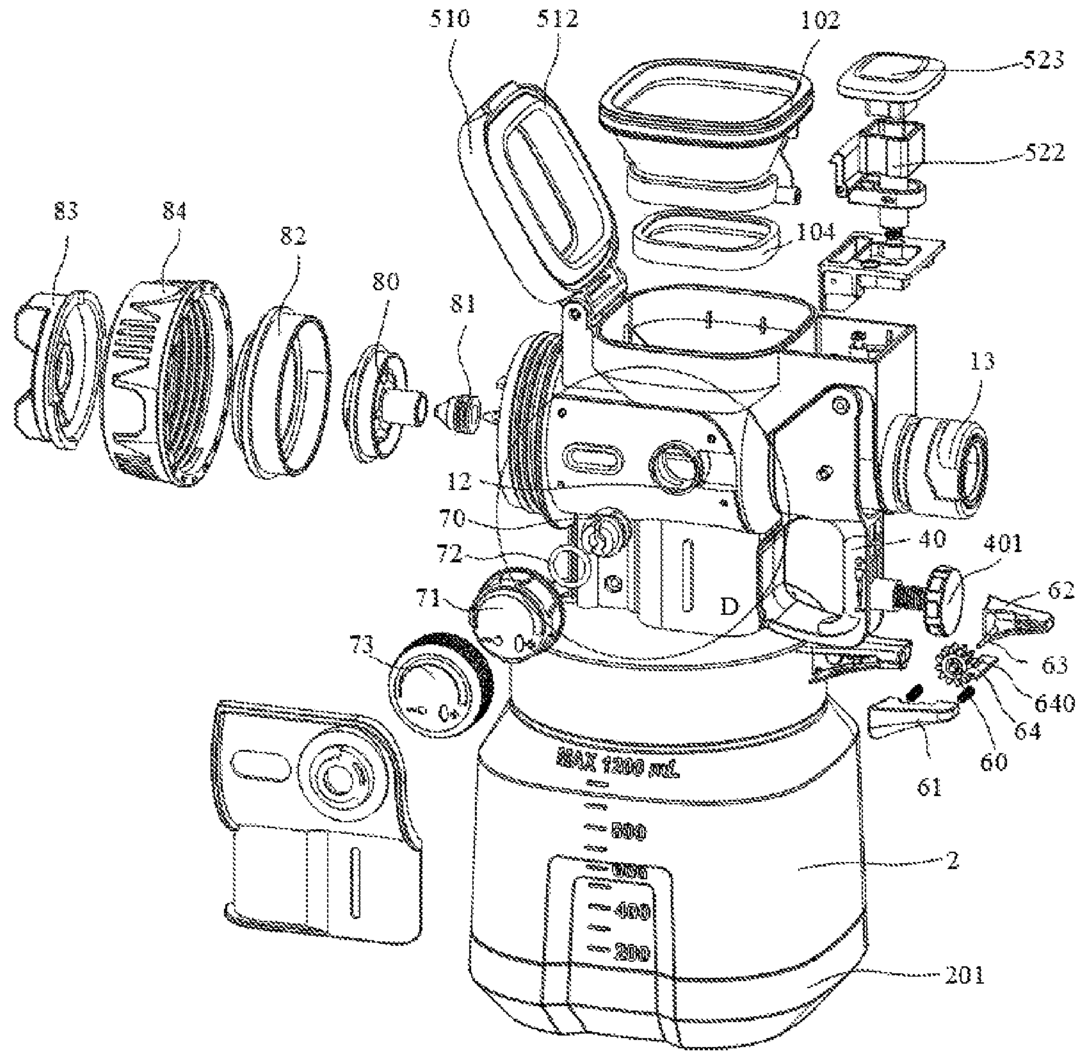
FIG. 2 is an exploded view of an embodiment of the present invention.
Figure 3:
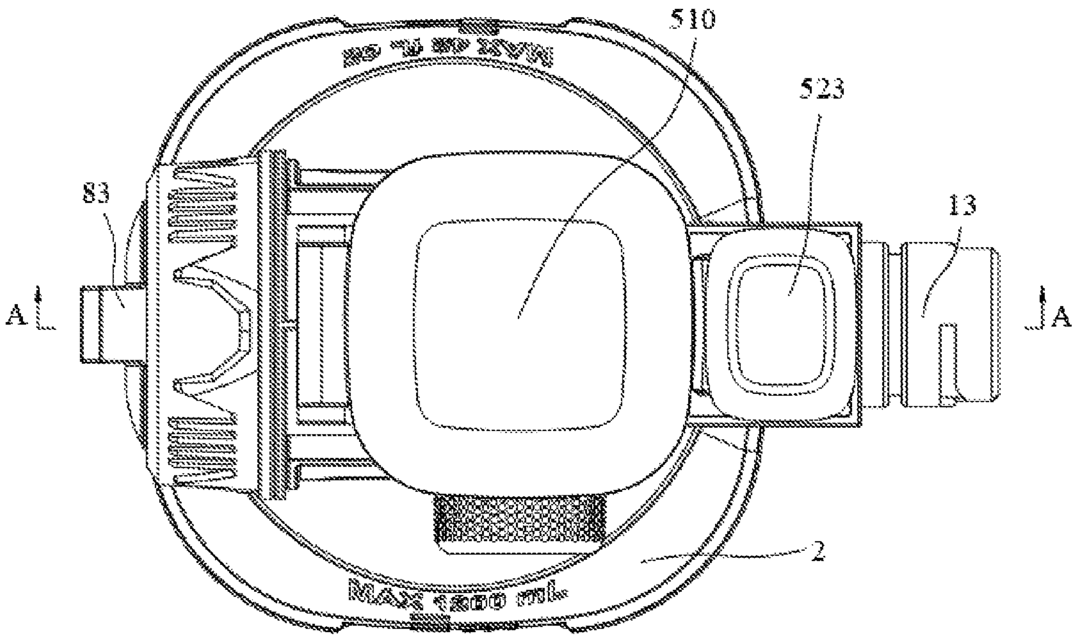
FIG. 3 is a top view of an embodiment of the present invention.

As shown in FIGS. 2 and 5, the trigger assembly 4 is attached to the gun body 1, and the trigger assembly 4 is coupled to the connecting rod 33 by means of a thimble pull rod 34, and axially moves the connecting rod 33 by means of the thimble pull rod 34.

The trigger assembly 4 comprises a trigger body 40 hinged at the upper end to the gun body 1, the trigger body 40 is connected to a thimble pull rod 34, by triggering the trigger body 40, the thimble pull rod 34 can drive the connecting rod 33 to realize axial movement; and there is also a trigger knob 401 provided on the trigger body 40 for adjusting the rotation angle of the trigger body 40.

As shown in FIGS. 1, 2 and 5, a trigger position holding device 6 for fixing the position of the trigger assembly 4 is also provided on the gun body 1, the trigger position holding device 6 comprising a multi-toothed turntable 60 rotatably disposed on the gun body 1, the rotational axis of the multi-toothed turntable 60 being disposed in the same direction as an articulating axis of the trigger body 40; and on the trigger body 40 there is provided in cooperation with the multi-toothed turntable 60 a multi-tooth drive portion 108; and a left push block 61 and a right pusher block 62 are provided opposite each other on both sides of the multi-tooth turntable 60, the left push block 61 and the right push block 62 being connected by means of a push rod 63, and a limiting block 64 is also fixedly provided between the left push block 61 and the right push block 62, and a notch 640 is provided in the limiting block 64.

The reset element is provided between the left push block 61 and the gun body 1 or between the right push block 62 and the gun body 1. In this embodiment, two springs are used for the reset element. Of course, the reset elements are not limited to the use of springs, but can also be rubber and other parts with elasticity, which can allow the left push block 61 or the right push block 62 to play the role of reset.

When the left push block 61 and the right push block 62 are in a free state, the notch 640 made in the limiting block 64 avoids the multi-tooth turntable 60, when the limiting block 64 is translated by pushing the left push block 61 or the right push block 62, the limiting block 64 extends between the teeth of the multi-tooth turntable 60, restricting the rotation of the multi-tooth turntable 60. In this way, the trigger assembly 4 is in a fixed position, and the trigger assembly 4 causes the thimble assembly 3 to be in a fixed position by means of the thimble pull rod 34, so that the opening distance between the thimble 31 and the nozzle of the spray gun remains constant, which enables the sprayed liquid to be continuous and uniform, and the user does not need to force the trigger body 40 all the time, which greatly increases the convenience of use.

As shown in FIG. 4, a suction channel 109 is provided in the gun body 1, the upper end of the suction channel 109 is connected to the liquid outlet channel 107, and the lower end of the suction channel 109 is connected to a suction tube 21, the suction tube 21 extending into the material pot 2.

In this embodiment, the bottom surface of the material pot 2 is set in the shape of a funnel and a liquid accumulation portion 200 is formed at the lowest position, and the bottom end of the suction tube 21 extends into the liquid accumulation portion 200, so that when the liquid in the material pot 2 is less, the liquid can be accumulated into the liquid accumulation portion 200 through the funnel-shaped bottom surface, and the liquid can be completely sucked up and sprayed out to avoid waste.

In order to promote the aesthetics of the material pot 2 and its stability when placed, a pot seat 201 is provided at the bottom of the material pot 2, and the pot seat 201 and the material pot 2 can be connected by means of screws or clasps or the like.

As shown in FIG. 8, there is formed within the gun body 1 from a first air outlet channel 1011, the liquid filling channel 101 passes through the first air outlet channel 1011 and the two are not connected to each other during operation; and the connecting sleeve 32 is located within the first air outlet channel 1011.

As shown in FIGS. 4, 5 and 8, a material pot air inlet channel 1010 is provided in the gun body 1 connecting the first air outlet channel 1011 with the material pot 2, the material pot air inlet channel 1010 is provided vertically, with a cross-section that increases sequentially from the upper end to the lower end.

The function of the material pot air inlet channel 1010 is to introduce the gas passed into the spray gun into the material pot 2, pressurize the liquid to be sprayed in the material pot 2, and cause the liquid to be sprayed through the nozzle of the spray gun, specifically in this embodiment, the pressurized liquid passes through the suction tube 21, the suction channel 109, and the liquid outlet channel 107 in turn before being sprayed out by the nozzle of the spray gun.

Therefore, the material pot air inlet channel 1010 can be provided at any suitable location on the gun body 1 as long as it is capable of introducing gas into the material pot 2.

In this embodiment, the material pot air inlet channel 1010 is integrally molded with the gun body 1, at the bottom end of the material pot air inlet channel 1010, a tab extending into the material pot 2 is reserved, and a one-way valve is provided on the tab, and the one-way valve is used to prevent the liquid in the material pot 2 from entering into the air outlet channel of the gun body, and in this embodiment, the one-way valve is a duckbill valve.

Figure 6:
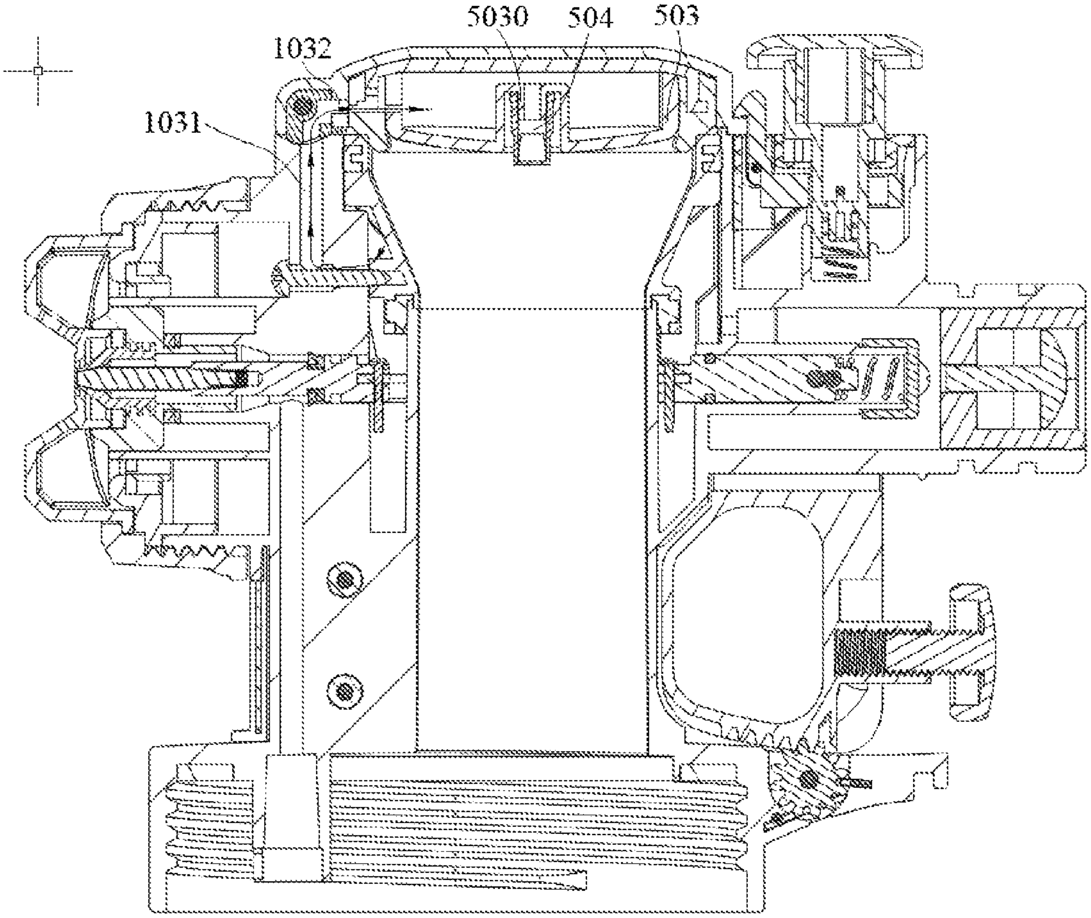
FIG. 6 is a schematic view of the structure of an alternative embodiment of the feed pot intake channel in the present invention.

As shown in FIGS. 4, 6 and 8, as an alternative embodiment of this embodiment, the material pot air inlet channel 1010 may further comprise a first air hole 1031 disposed on the gun body 1 and communicating with the first air outlet channel 1011, and a second air hole 1032 is provided in the sealing cover assembly 5, the second air hole 1032 communicating with the first air hole 1031; and the sealing cover assembly 5 also includes an inner cover 503, on the inner cover 503 there is an gas nozzle 5030, on the gas nozzle 5030 there is a one-way valve that prevents liquid inside the material pot 2 from entering into the gas nozzle 5030, and in the present embodiment, the one-way valve is a duckbill valve 504, this solution can introduce gas inside the first air outlet channel 1011 into the sealing cover assembly 5, and apply pressure to the inside of the material pot 2 through the gas nozzle 5030 and the duckbill valve 504, this solution is better than the above one. The solution has significant advantages over the previous solution, when the material pot 2 is filled with liquid, the one-way valve of the previous solution is very close to the surface of the liquid, and a smaller air pressure will provoke the liquid to splash, which will result in the liquid pressure through the suction tube 21 not being constant; and the solution enables the gas to apply pressure from the top of the spray gun to the surface of the liquid inside the material pot 2, and the liquid is subjected to a large area of force and a balanced pressure, and the liquid pressure through the suction tube 21 is constant, so that the effect of spraying the liquid is better.

As shown in FIGS. 1 and 8, a second air outlet channel 1012 is also provided in the gun body 1, the second air outlet channel 1012 being connected or closed to the first air outlet channel 1011 by means of an air valve assembly 7.

Figure 11:
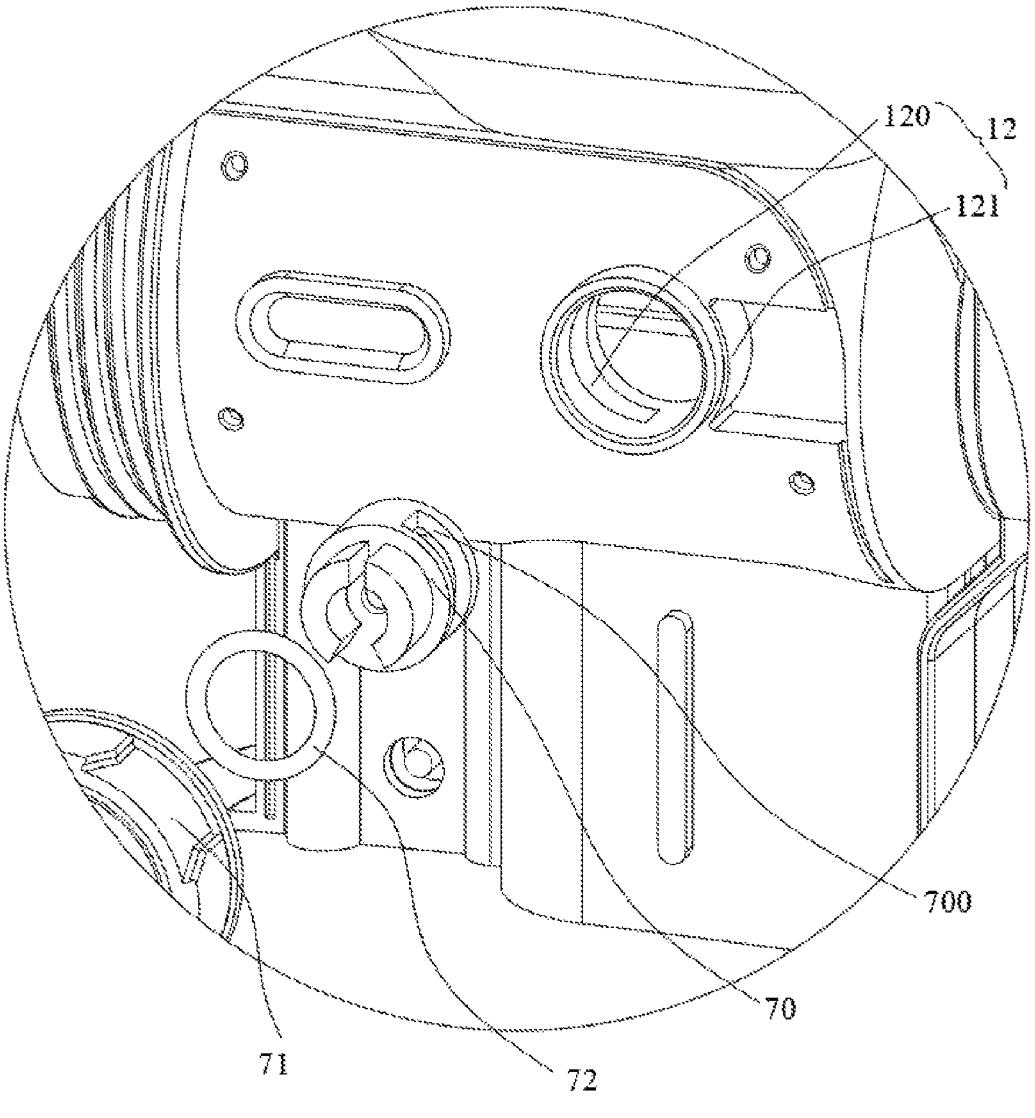
FIG. 11 is an enlarged view at D in FIG. 2.

As shown in FIG. 11, a valve body mounting portion 12 is provided on the gun body 1, the valve body mounting portion 12 comprising a solid side 121 and a notched side 120, the air valve assembly 7 comprising a valve spool 70 rotatable within the valve body mounting portion 12, the valve spool 70 is provided with a circular portion with a circular cross-section near the end of the first air outlet channel 1011, and on the circular portion there is provided a valve port 700, when the valve port 700 is rotated to correspond to the solid side 121, the gas is blocked and the second air outlet channel 1012 is closed to the first air outlet channel 1011; and when the valve port 700 is rotated to correspond to the notched side 120, the gas can pass through the notched side 120 and the second air outlet channel 1012 is connected; and there is also provided on the valve spool 70 an adjusting knob 71 which can drive the valve spool 70 to rotate.

In this embodiment, a spool sealing ring 72 is provided between the valve spool 70 and the gun body 1, and a non-slip end cap 73 is also provided over the adjusting knob 71.

At the front end of the gun body 1 there is provided a nozzle assembly 8, the nozzle assembly 8 comprising a nozzle seat 80 fixedly connected to the gun body 1, on the nozzle seat 80 there is provided a nozzle 81, the thimble 31 cooperating with the nozzle 81, between the gun body 1 and the nozzle seat 80 there is provided a wind guide sleeve 82, and on the wind guide sleeve 82 there is also provided a flow cap 83 which can adjust the amount of air coming out of the wind guide sleeve 82, and the flow cap 83 is fixed to the gun body 1 by means of a fastening knob 84.

The wind guide sleeve 82 is used to direct airflow through the first air outlet channel 1011 and the second air outlet channel 1012, respectively; and the air valve assembly 7 may introduce airflow within the first air outlet channel 1011 into the second air outlet channel 1012.

The flow cap 83 is formed between the flow cap 83 and the nozzle 81 with an air outlet for airflow within the first air outlet channel 1011, and the flow cap 83 is further provided with an air outlet hole for airflow within the second air outlet channel 1012.

The gun body 1 is also provided with a quick coupling 13 for supplying compressed air to the gun, the quick coupling 13 being in communication with the first air outlet channel 1011.

The sealing cover assembly 5 includes a cover body assembly 51 and a locking assembly 52, before the spray gun works, press the button cover 523, open the cover body assembly 51, and then pour liquid into the guide hopper 102, and the liquid flows into the material pot 2 through the liquid filling channel 101.

By setting the liquid filling channel 101, liquid can be added to the material pot 2 from the top or side of the gun without unscrewing the material pot 2 from the gun, so that the liquid on the suction tube 21 will not drip to the ground to pollute the environment and cause waste, and the suction tube 21 will not stick to the sundries, at the same time, with the solution, the cover body assembly 51 is located on the top or the side of the gun body 1, and the space for the operation of the liquid when adding liquid is not affected at all by the other parts of the gun, so as to realize the purpose of convenient and rapid liquid filling.

When working, compressed air is connected to the quick coupling 13, and the airflow connected from the quick coupling 13 is blown out from the air outlet after passing through the first air outlet channel 1011, the trigger body 40 is triggered, and the liquid in the material pot 2 is pressurized to enter the liquid outlet channel 107 and then sprayed out from the nozzle, and both of them are mixed to form an atomized liquid fog, which is sprayed out in a set shape under the limitation of the flow cap 83. When it is necessary to change the shape of the liquid mist, the shape of the liquid mist is changed by turning the adjusting knob 71 so that the airflow from the first air outlet channel 1011 enters the second air outlet channel 1012 and is blown out from the air outlet holes. Further turning the adjusting knob 71 adjusts the flow rate and flow rate of the airflow through the second air outlet channel 1012, thereby obtaining different shapes of the liquid mist.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. A spray gun for convenient liquid filling, comprising:

a gun body, a material pot, a thimble assembly and a trigger assembly; and said gun body having a connecting seat integrally provided at a lower end of the gun body, said material pot connected and fixed to said connecting seat, said gun body being provided with a liquid filling channel, a lower end of said liquid filling channel being connected to said material pot, said liquid filling channel running upwardly through said gun body, so that an upper end of said liquid filling channel is connected to the outside world, and said gun body being provided with a sealing cover assembly for closing said liquid filling channel at the upper end of said liquid filling channel;

wherein said thimble assembly comprises a thimble, a connecting sleeve, a connecting rod and a thimble reset element; said trigger assembly is hingedly coupled to said gun body, said trigger assembly is coupled to said connecting rod to drive axial movement of said connecting rod, and said connecting sleeve is integrally provided in said gun body, the connecting rod is disposed within said connecting sleeve and is slidingly mated with said connecting sleeve; and wherein the rear end of said connecting sleeve is connected to the front end of said connecting rod, and the front end of said connecting sleeve is connected to the rear end of said thimble; said connecting sleeve is located outside of said liquid filling channel, and said connecting sleeve has a cross-sectional area in the axial direction along said connecting rod which is larger than that of said liquid filling channel; said connecting sleeve can be moved back and forth in the periphery of said liquid filling channel along the axial direction of said connecting rod.

2. A spray gun for convenient liquid filling according to claim 1, wherein said liquid filling channel runs upwardly through an upper end or side of said gun body; and said sealing cover assembly is secured to said liquid filling channel by means of threads or snaps.

3. A spray gun for convenient liquid filling according to claim 1, wherein a guide hopper is sealingly fixed at the upper end of said liquid filling channel, said guide hopper having a large top and small bottom cross-section in the shape of a funnel, said guide hopper comprises a feeding port is provided at the upper end of said gun body, and said sealing cover assembly is connected to said feeding port to close the guide hopper.

4. A spray gun for convenient liquid filling according to claim 3, wherein said guide hopper is integrally provided with two locating in a lower end of the guide hopper, said a first groove is formed between the two locating tabs, wherein the first groove can accommodate a sealing ring, and a first sealing ring is provided in said first groove; the upper end of said liquid filling channel is tightly inserted into the lower end of said guide hopper against said second locating tab, and the upper end of said liquid filling channel is sealed with the lower end of said guide hopper; and a sealing ring groove is provided on the outside of the upper end of said guide hopper, and a second sealing ring is provided in said sealing ring groove.

5. A spray gun for convenient liquid filling according to claim 1, wherein said sealing cover assembly comprises a cover body assembly and a locking assembly, said cover body assembly comprising a filling cap hinged at one end to said gun body, with a cover sealing ring sealing said liquid filling channel on the interior of said filling cap.

6. A spray gun for convenient liquid filling according to claim 5, wherein said locking assembly comprises a locking clasp hinged to said gun body having a cross-section in the shape of an L at the upper end of said locking clasp there is a locking tongue away from the body of said locking clasp, and said locking tongue is fastened to said filling cap when said cover body assembly covers said liquid filling channel; and at the bottom of said locking clasp there is a unlocking lever hinged to the bottom of said locking clasp, and pressing said unlocking lever can cause said locking clasp to rotate at an angle and said locking tongue to disengage from said filling cap; and a locking lever reset element is provided at the bottom of said unlocking lever.

7. A spray gun for convenient liquid filling according to claim 1, wherein said connecting rod and said thimble are both connected to said connecting sleeve by means of screws or pins.

8. A spray gun for convenient liquid filling according to claim 1, wherein a liquid outlet channel is provided in said gun body, said thimble being located in said liquid outlet channel, said thimble reset element being located between said connecting rod and said connecting sleeve or between said thimble and said liquid outlet channel.

9. A spray gun for convenient liquid filling according to claim 8, wherein said thimble reset element is a spring, a first locating tab is integrally provided on said thimble, said spring is sleeved on said thimble and said spring rests against said first locating tab and said liquid outlet channel, and said connecting sleeve is made of a rigid material or a flexible material.

10. A spray gun for convenient liquid filling according to claim 1, wherein said thimble reset element is a spring, said spring resting against an inner bottom surface of said connecting sleeve and between the rear end of said connecting rod, said connecting sleeve being made of a rigid material.

11. A spray gun for convenient liquid filling according to claim 1, wherein said trigger assembly comprises a trigger body hinged at the upper end to said gun body, a thimble pull rod is movably provided on said trigger body, said thimble pull rod is connected to said connecting rod, and said connecting rod can be driven to move axially by said thimble pull rod when said trigger body is triggered; and there is also a trigger knob provided on said trigger body for adjusting the angle of rotation of said trigger body.

12. A spray gun for convenient liquid filling according to claim 1, wherein said gun body is further provided with a trigger position holding device for fixing the position of a trigger assembly, said trigger position holding device comprising a multi-toothed turntable rotatably disposed on said gun body, the rotational axis of said multi-toothed turntable being disposed in the same direction as an articulating axis of said trigger assembly; said trigger body being provided with a multi-tooth drive portion; a left push block and a right push block are provided opposite to each other on both sides of said multi-tooth turntable, said left push block and said right push block being connected by a push rod, and a limiting block is also fixedly provided between said left push block and said right push block, with a notch being provided in said limiting block, A reset element is provided between said left push block and said gun body or between said right push block and said gun body, so that when said left push block and said right push block are in a free state, a notch cut in said limiting block avoids said multi-toothed turntable; and when said limiting block is pushed to translate said left push block or said right push block, said limiting block extends between the teeth of said multi-toothed turntable, limiting said multi-toothed turntable from rotating.

13. A spray gun for convenient liquid filling according to claim 1, wherein a suction channel is provided in said gun body, the upper end of said suction channel is connected to said liquid outlet channel, and the lower end of said suction channel is connected to a suction tube, said suction tube extends into said material pot.

14. A spray gun for convenient liquid filling according to claim 1, wherein a first air outlet channel is provided in said gun body, said liquid filling channel passes through said first air outlet channel and the two are not connected to each other during operation; said connecting sleeve is located in said first air outlet channel; a material pot air inlet channel is provided in said gun body which connects said first air outlet channel with said material pot; and a second air outlet channel is provided in said gun body, said second air outlet channel and said first air outlet channel are connected or closed by an air valve assembly.

15. A spray gun for convenient liquid filling according to claim 14, wherein said material pot air inlet channel is set vertically, and its cross-section increases sequentially from the upper end to the lower end; and at the lower end of said material pot air inlet channel there is a one-way valve gate preventing the liquid in the spray pot from entering the air outlet channel of the spray gun.

16. A spray gun for convenient liquid filling according to claim 14, wherein said material pot air inlet channel includes a first air hole disposed in said gun body and communicating with said first air outlet channel, and a second air hole is provided in said sealing cover assembly, with the second air hole communicating with said first air hole; and said sealing cover assembly further comprises an inner cover, with an gas nozzle provided in said inner cover, and a one-way valve door provided in said gas nozzle to prevent liquid from entering the air mouth inside the material pot.

17. A spray gun for convenient liquid filling according to claim 16, wherein a nozzle assembly is provided at the front end of said gun body, said nozzle assembly comprising a nozzle seat fixedly connected to said gun body, a nozzle provided in said nozzle seat, said thimble cooperating with said nozzle; a wind guide sleeve is provided between said gun body and said nozzle seat; a flow cap is provided on said wind guide sleeve that adjusts the amount of air coming out of said wind guide sleeve, said flow cap being fixed to said gun body by means of a fastening knob.

18. A spray gun for convenient liquid filling according to claim 14, wherein a valve body mounting portion is provided on said gun body, said valve body mounting portion comprising a solid side and a notched side, said air valve assembly includes a valve spool which can be rotated in said valve body mounting portion, said valve spool has a ring portion with a circular cross-section near one end of said first air outlet channel, and there is a valve port on said ring portion through which gas can flow, when said valve port is rotated to correspond to said solid side, the gas is blocked, and said second air outlet channel and said first air outlet channel are closed; and when said valve port is rotated to correspond to the side of said valve port, the gas is not blocked and said second air outlet channel is connected to said first air outlet channel; there is also provided on said valve spool an adjusting knob which can drive said valve spool to rotate; there is provided a spool sealing ring between said valve spool and said gun body, and there is also provided a non-slip end cap over said adjusting knob.

* * * * *